July 9, 1957   R. L. JACKSON, JR   2,798,531
CONDENSED FILAMENTOUS MAT AND METHOD AND APPARATUS FOR MAKING SAME
Filed Jan. 6, 1953   2 Sheets-Sheet 1
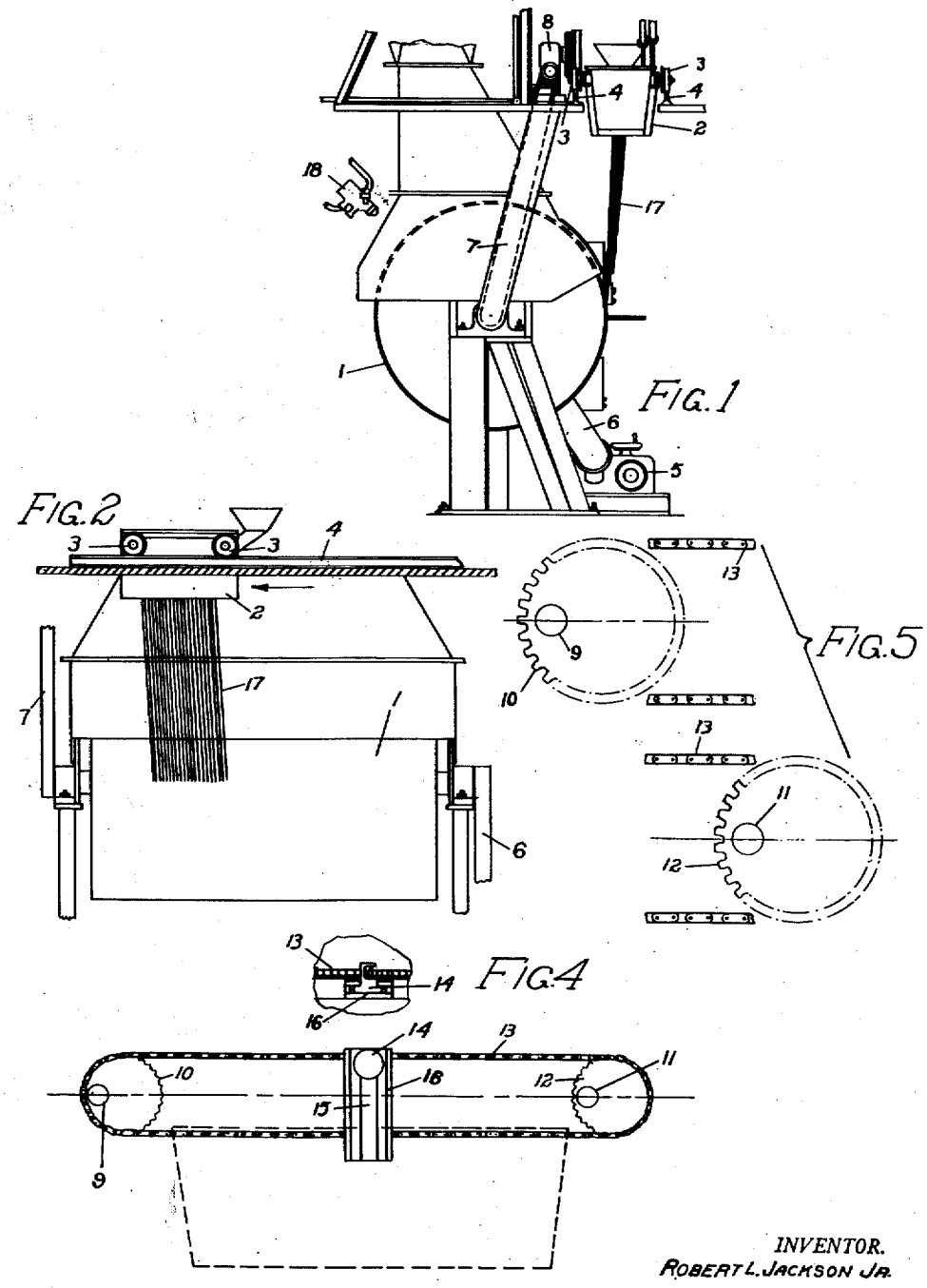
INVENTOR.
ROBERT L. JACKSON JR.
BY Arthur Robert
ATTORNEY July 9, 1957   R. L. JACKSON, JR   2,798,531
CONDENSED FILAMENTOUS MAT AND METHOD AND APPARATUS FOR MAKING SAME
Filed Jan. 6, 1953                                    2 Sheets-Sheet 2

INVENTOR
ROBERT L. JACKSON JR.
BY Arthur Robert
ATTORNEY

United States Patent Office 2,798,531
Patented July 9, 1957

2,798,531
CONDENSED FILAMENTOUS MAT AND METHOD AND APPARATUS FOR MAKING SAME

Robert L. Jackson, Jr., Charlestown, Ind., assignor to American Air Filter Company, Inc., Louisville, Ky., a corporation of Delaware Application January 6, 1953, Serial No. 329,821

15 Claims. (Cl. 154—1.7)

One form of apparatus for making condensed filamentous mats of this type out of glass comprises: a drum; a melting furnace; means for rotating the drum at a constant speed (approx. 100 to 200 R. P. M.) and for reciprocating the furnace back and forth axially along the top of the drum, said means operating to drive the furnace at a constant speed through a central area which occupies the space between terminal areas where the speed of the furnace is decelerated to zero and then accelerated to maximum as the direction of furnace travel is reversed; a group of spinnerets for feeding a corresponding group of glass filaments from the reciprocating furnace to the rotating drum so that said group of filaments is helically wound about the drum first in one direction to form one layer (approx. 6' axially and 12' circumferentially) and then in the reverse direction to form the next adjacent overlying layer; and means for spraying a resinous adhesive on said filaments during the feeding operation.

In this operation, each filament, in the central area of each layer, forms a single spiral or helix which is characterized by a uniform pattern of spiral turns of equal angularity relatively to the plane of rotation; hence such turns necessarily are of equal length and equal spacing. Furthermore all of the helical turns within the central area of one layer extend at one angle in one direction relatively to the plane of rotation while those of the next adjacent overlying layer extend at the same angle but in the opposite direction relatively to the same plane so that the turns of any one layer may be said to "cross" the corresponding turns of each next adjacent layer forming a small acute angle therewith.

The operation of this apparatus continues until the amount of glass (from 20 to 60 pounds) fed (at a rate approx. 12 pounds per hour) is sufficient to build up on the drum a cylindrical condensed mat of desired thickness (ranging usually from 1/16" to 3/16"). Then the cylindrical condensed mat is: slit from one circumferential end edge to the other; removed from the drum; trimmed (to 12' by 4' to 4.67') by removing all of the end area and sometimes more (8" to 1') from each end edge; expanded or stretched axially or endwise to increase its 4 to 4.67' length (up to say 325') and reduce its 12' width (down to 4' at the ends and 3' at its center); stretched laterally to make it of (4') effective width; passed through an oven to set the resin; and usually resprayed with resin and reheated in the oven to set it. During endwise expansion, the trimmed mat "fluffs up" to a degree substantially increasing its porosity and thickness (up to from 1/2" to 3"). The "fluffed" mat is then trimmed and cut into small sections or filter pads of desired size.

The foregoing practice has a number of objections. First, with a sprocket (6" O. D.) and chain drive for the furnace, the amount of end area waste (from 22% to 33%) which must be removed from the (circumferential) ends of the condensed mat is objectionably high. Second, when expanded endwise, its weight causes it to attenuate or narrow and to sag along and toward its center. The attenuation reduces its width, necessitating that it be manually stretched sidewise to make the entire "ribbon" of uniform width. This manual expansion coupled with the uneven expansion caused by sagging produces objectionably thin and unduly porous "sag loss" areas (approx. 20 to 25% of the total area) along the center which must be cut away as waste. Third, it must be expanded endwise enough to reduce its initial (12') width down to 4' in order to keep the "sag loss" at a minimum and this 4' width substantially limits the range of air filter pad sizes which may be obtained from it efficiently i. e. with minimum trim losses. Fourth, the finished pad, while resilient, usually has an unduly low resistance to compression. Because of this, spray resins employed must be of a type which gives the pad added resistance to compression and this not only limits the number or range of resins which can be used but normally makes the reheating and respraying operation necessary.

The principal object of the present invention is to eliminate or substantially minimize the foregoing objections.

Other important objects of this invention are: to reduce, in substantial measure, the amount of material which must be removed from the circumferential end portions of the mat and the amount of sag loss; to produce a mat which can be expanded endwise to a satisfactory length without necessarily reducing its width below 5 feet and to accomplish this with a very substantial reduction in sag loss; to produce a finished pad with substantially improved resiliency, resistance to compression and uniformity; and to so improve the finished pad structurally that any of a wide range of resins may be used as bonding agents without requiring the pad to be resprayed and reheated.

Other important objectives are to provide a novel method and novel machine for accomplishing one or more of the foregoing objectives.

In accordance with the present invention, the speed relationship between the drum and furnace is varied cyclically (preferably continuously) between minimum and maximum limits so as to produce, in the central area of each layer, one or more single filament helical patterns, each characterized by turns which vary in angularity, length and spacing between said minimum and maximum speed limits. While this may be done in a variety of ways, as by varying the rotational speed of the drum, it preferably is accomplished by varying the speed of the furnace between minimum and maximum limits one or more times during each of its traverses. This feature of the invention appears to be primarily responsible for the accomplishment of all of the objectives of the invention except uniformity in fibre distribution, which, in itself, appears to contribute to the accomplishment of some of the other objectives.

In further accordance with the present invention, the variation in furnace speed is carried out in such a manner as to offset the filament patterns of each layer from the filament patterns of one or more succeeding layers. This is readily accomplished by making the furnace, during each of its traverses, undergo one or more speed variation patterns plus or minus a fraction of one of such speed variation patterns. In this way, the filament patterns in successive layers will be offset, from the filament patterns in any immediately preceding layer, progressively more and more in the plus or minus direction, as the case may be, so that the filament patterns in any one layer either are not matched with any filament pattern in any succeeding layer or are matched only with the filament patterns in one or more desirably spaced layers. This feature obviously insures uniformity in fibre distribution and accordingly promotes the securement of greater resilience, resistance to compression, structural strength, etc.

The invention is illustrated in the accompanying drawings, wherein:

Figure 1 is a somewhat diagrammatic end view of an apparatus for producing a condensed mat in accordance with the present invention;

Figure 2 is a partly broken side elevational view of the apparatus shown in Figure 1;

Figure 3 is an enlarged detail view of part of the furnace traversing drive mechanism;

Figure 4 is a detail view of the pin mechanism which connects the traversing chain to the furnace;

Figure 5 is a broken view of the traversing chain drive mechanism indicating the positional relationship of the drive and idling sprockets;

Figure 9:
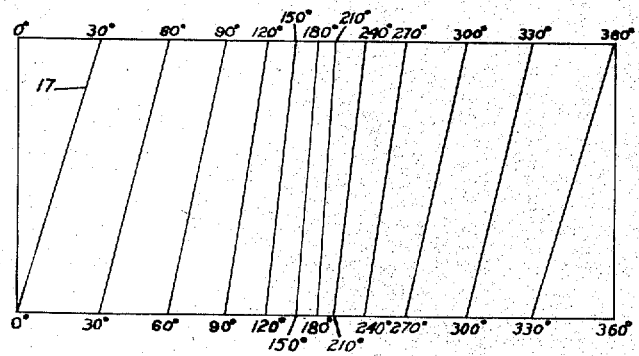
Figure 6:
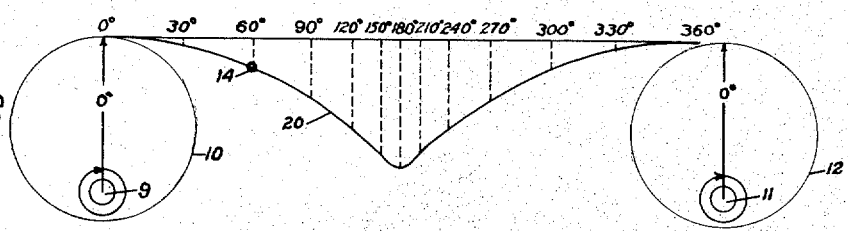
Figure 7:
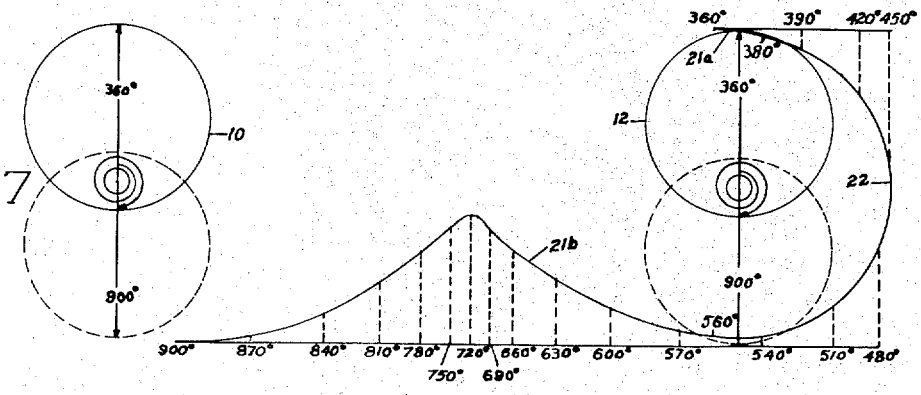
Figure 8:
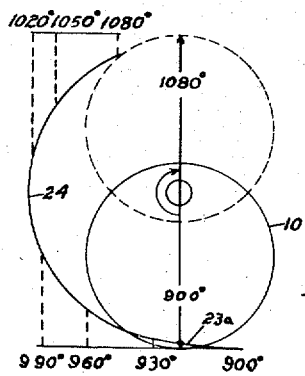

Figures 6, 7 and 8 collectively indicate the variation in the speed of the furnace from the path of the pin, which connects the traversing drive chain to the furnace, during three full revolutions of the drive sprocket, the path of the pin being shown in Figure 6 during one full revolution of the drive sprocket, in Figure 7 during the one and one-half revolutions and in Figure 8 during one-half revolution; and Figure 9 schematically represents a developed plan view of the filament pattern of a single filament which is wound on the drum during one full revolution of the drive sprocket, this specific pattern being positioned on the drawing to coordinate it with Figure 6.

*Apparatus*

The apparatus illustrated in the drawings conventionally includes: a drum 1 mounted for rotation; a melting furnace 2 mounted for reciprocation and therefore provided with rollers 3 for reciprocating movement along rails 4; drum drive means including a variable speed drive motor 5 connected through a speed transmission device 6 to one end of the drum shaft; furnace drive means including another speed transmission device 7 connecting the other end of the drum shaft through a variable speed ratio device 8 to a sprocket (6" O. D.) and traversing chain drive mechanism for the furnace, this mechanism including a drive shaft 9 carrying a drive sprocket 10, an idling shaft 11 carrying an idling sprocket 12 and a traversing chain 13 mounted on the sprockets 10 and 12, the chain 13 carrying a pin 14 which extends into slot 15 of a bracket 16 that is rigidly mounted on the furnace 2; a group of spinnerets (not shown) on the furnace 2 for feeding a corresponding group of glass filaments 17 from the furnace to the drum; and a spray gun 18 for spraying the filaments 17 with a suitable slow setting adhesive, preferably of a natural or synthetic resinous nature, this spray gun being mounted to traverse the drum with the furnace by suitable means, not shown.

The foregoing apparatus is conventional except possibly for the variable speed motor 5 and the variable speed ratio device 8. Its operation is conventional in that the motor 5 may be operated to drive the drum at a constant speed and to reciprocate the furnace axially back and forth along the drum. However, under conventional operating conditions, the furnace is driven through the central area between sprockets at a constant speed, the speed of the furnace changing only as the drive pin 14 traverses around the sprockets in reversing the direction of furnace travel.

*Speed and filament patterns*

In accordance with the present invention, the speed relationship between the drum and furnace is continuously varied by causing the speed of the furnace to vary continuously between minimum and maximum limits one or more times during each of its traverses through the central area. This may be accomplished in various ways but is most simply accomplished by mounting the drive sprocket 10 eccentrically upon the drive shaft 9, the idling sprocket 12 preferably being similarly mounted on idling shaft 11 primarily in order to keep the traversing chain 13 taut.

The effect of this drive arrangement on the horizontal speed of the furnace through the central area may be readily appreciated by following the travel of pin 14 at 30° intervals as the drive shaft 9 rotates through one full revolution, as illustrated in Figure 6. Here the pin 14 is about to enter the central area from a zero position corresponding to that of the tooth of maximum radius on drive sprocket 10. With drive shaft 9 rotating at a constant speed, the pin will be at maximum speed when it is in the zero position indicated in Figure 6. During one full revolution of drive shaft 9, the pin 14 travels along the cycloidal path 20. The successive positions of the pin in path 20, at 30° intervals, are projected upwardly to a straight line series of points marked with the corresponding degrees of shaft 9 rotation. The space between these degree marks indicates the extent of the horizontal travel of the furnace during each 30° movement and therefore during equal time intervals. From this, it will be seen that the pin decelerates from maximum speed at 0° to a minimum speed at 180° and then accelerates to the maximum at 360°. This speed pattern may be and preferably is repeated one or more times during each traverse of the furnace through the central area from the drive sprocket to the idling sprocket.

The effect of the furnace speed pattern on the central area filament pattern is illustrated in Figure 9, which represents, on a schematic straight line basis, a developed plan view of the helical pattern produced in the central area by a single filament during a single revolution of the drive shaft 9 and a multiplicity of revolutions of the drum. Here, it will be noted that the first line 17 at the extreme left of Figure 9, which represents one filament 17 laid during furnace movement corresponding to 0° to 30° sprocket movement, is of a certain length and a certain angularity relatively to the plane of rotation. The next adjacent line, which represents the next group of turns of that same filament, laid during movement from 30° to 60°, is slightly shorter than the first filament and its angle to the plane of rotation is smaller. Proceeding from this point progressively through succeeding groups of turns, laid at 30° intervals on the approaching side of the 180° position which the furnace reaches at minimum speed, it will be noted that the length and angularity of successive turns of the filament progressively decreases. Now, as the furnace speed increases between 180° and 360°, the length and angularity of successive groups of turns of the same filament progressively increase. Where the speed variation pattern, which produced the filament pattern in Figure 9, is repeated several times, during one traverse through the central area, then the filament pattern of Figure 9 will likewise be reproduced a corresponding number of times.

*Filament patterns offset*

In further accordance with my invention, each filament pattern in one layer is offset from the filament patterns in one or more preceding and succeeding layers by causing the furnace, during each of its traverses, to undergo one or more speed variation cycles plus or minus a fraction of one of such speed cycles. While this may be accomplished in various ways, it is most simply accomplished by providing the chain 13 with a number of links corresponding to a multiple of the number of teeth in the drive sprocket plus or minus a fraction thereof. For example, if we assume that the drive sprocket has 30 teeth and that the chain is provided with 180 links, there will be 3 full sprocket revolutions for each traverse of the chain and 6 sprocket revolutions for each full revolution of the chain which embraces two traverses. In this case, each filament of one pattern laid on the forward traverse will cross the corresponding filament of the corresponding pattern laid on the return traverse. But, if a number of hunting links, corresponding to a fraction of the 30 teeth on the drive sprocket, are added to or subtracted from the chain, the patterns laid on the return traverse will be offset from those laid on the initial traverse. This is illustrated in Figures 6–8.

In Figure 6, it will be noted that, during one complete revolution of the drive and idling sprockets 10 and 12, the first cycloidal path 20 of the pin 14 extends from the top of the drive sprocket 10 to a point short of the driven sprocket 12. If we assume that the entire chain 13 is 3 hunting links longer than a multiple of the number of teeth in each sprocket, then the first cycloidal path 20, in Figure 6, will terminate 1.5 links short of reaching the sprocket 12. Consequently, during the next 1½ revolutions of the sprocket, the second cycloidal path 21 of the pin 14 will have two sections designated 21a and 21b. Section 21a will extend from the end of path 20 to a piont where the pin 14 reaches the sprocket 12. Thereupon the second cycloidal path 21 of the pin will be suspended while the pin follows, for 180°, the circular path 22 of that particular tooth on the idling sprocket 12 with which it coincides. As soon as it leaves the idling sprocket, it will resume its travel along the second cycloidal path 21 at point corresponding to the one at which that path was suspended. Thus Figure 6 assumes that, in path 21a, the pin will reach the sprocket 12 at 380°, 20° after one complete sprocket revolution, and, with this assumption, the pin will travel circularly with the sprocket 12 along path 22 up to 560° where it simultaneously leaves path 22 and sprocket 12 and enters the second section 21b of the cycloidal path 21.

The furnace, in traveling 1½ revolutions from one end of the second cycloidal path 21 to the other, will first move in one direction along the first traverse from 360° to the reversal point at about 470° and second, move in the opposite direction along the second traverse from the 470° reversal point to 900°. In traveling along the first traverse from 360° to 470°, the furnace will, first, decelerate from the maximum speed to an intermediate speed as the pin follows the cycloidal path 21a from 360° and, second, decelerate from that intermediate speed to zero speed as the pin follows the first half of the circular path 22 from 380° to 470°. In traveling from 470° to 900°, the furnace will, first, accelerate from zero speed to said intermediate speed as the pin follows the last half of the circular path 22 from 470° to 560°, second, decelerate from that intermediate speed to the minimum speed as the pin follows the second cycloidal path 21b from 560° to 720° and, third, accelerate from the minimum speed to the maximum speed as the pin follows the second cycloidal path 21b from 720° to 900°.

We have heretofore assumed that the chain was 3 links longer than a multiple of either sprocket. With that assumpton, the pin 14, at the end of the first cycloidal path 20 on the first traverse falls 1½ links short of the idling sprocket 12; hence at the end of the second cycloidal path 21 on the second traverse, the pin will fall 3 links short of the drive sprocket 10.

Figure 8 illustrates the path of the pin during the next ½ revolution, which is required to make 3 full revolutions of the drive sprocket 12 from the 0° point of Figure 6. Here again, the pin 14 begins to travel along section 23a of a third cycloidal path 23 and continues to do so until it strikes the drive sprocket 10 whereupon it follows the circular path 24 of that particular tooth on the drive sprocket 10 with which its position coincides, the circular path 24 also extending over 180°. When the sprocket 10 has completed ½ of a revolution from the 900° position and thus reaches the 1080° position, the pin will fall short of the top of that sprocket by 3 links.

It will now be observed that the minimum points, reached in Figure 6 on the first cycloidal path 20 at 180° and in Figure 7 on the second cycloidal path 21 at 720°, are offset from each other and that the cycloidal paths 20 and 21, as a whole, are similarly offset. Consequently, the filament patterns, corresponding to these paths, will be offset from each other in a like manner.

In actual practice, I have employed a drive sprocket having 30 teeth and a chain having 183 links. In order to make each traverse of the chain exactly the same, the teeth on the idling sprocket are offset from the teeth on the drive sprocket one-half of the pitch of the teeth. This can be seen with both sprockets in corresponding positions, as shown in Figure 5, where a line through the center of both the drive shaft 9 and the drive sprocket 10 bisects a tooth on the drive sprocket while a corresponding line on the idling sprocket 12 bisects the space between two of its adjacent teeth. This offset of the sprockets makes each traverse of the chain embrace 91.5 links while a single speed cycle or pattern of the furnace corresponds to 30 teeth on the sprocket or 30 links on the chain. Since the 360° "length of a pattern" multiplied by the "number of patterns" laid during a given time interval, must equal the "length of the traverse" times the "number of traverses" during that same time interval, the following formula obtains:

$$\frac{\text{length of traverse (91.5)}}{\text{length of pattern (30)}} = \frac{\text{number of patterns}}{\text{number of traverses}}$$

This formula does not distinguish between the whole or 360° cycloidal path patterns formed in the central area and the whole or 360° circular path patterns, one-half of which is formed in each end area. Since both end areas of each traverse collectively include one-half of a sprocket or 15 teeth and since 15 teeth are equivalent to 15 chain links, the formula, when limited to the central area, becomes:

$$\frac{\text{length of traverse (76.5)}}{\text{length of pattern (30)}} = \frac{\text{number of patterns}}{\text{number of traverses}}$$

In the latter formula, if we change the top and bottom numbers of the "length" ratio to the smallest whole numbers, we will get a "number" ratio for the central area representing the number of patterns laid and the number of traverses contained in one series wherein all patterns are offset from each other. Thus the "length" ratio of 76.5 to 30 reduces to the following "number" ratio:

$$\frac{\text{number of patterns}}{\text{number of traverses}} = \frac{51}{20}$$

This means that, during one series of 20 traverses, one series of 51 cycloidal path patterns will be laid in the central area with all patterns offset from each other and that, during the next series of 20 traverses, an identical series of 51 offset cycloidal path patterns will be laid, the corresponding patterns of both series being in matching relationship.

Similarly, the number ratio for both cycloidal and circular path patterns reduces to $$\frac{61}{20}$$

which includes 51 cycloidal path patterns and 10 circular path patterns extending through 360° or 20 circular path patterns each extending through 180°.

*Operation and advantages*

In operation, the speed ratio between the drum and furnace may be, for example, 60:1 or 60 revolutions of the drum during each traverse of the furnace but this ratio, or the speed of either the furnace or the drum or both may be varied widely because the speeds and the speed ratios employed depend on various factors such as the temperature of the furnace, the type of glass used, the size of spinneret openings on the furnace or the rate at which glass is fed, and the type and density of the mat to be formed.

In practicing the present invention, a condensed mat is conventionally sprayed as it is formed on the drum, axially slitted and removed, trimmed at its circumferential end edges, expanded endwise, stretched sidewise, heated to set the bond, and trimmed to remove sag loss areas, and then cut into pads.

The structure of this condensed mat is so improved at the terminal or end areas, that, with eccentric sprockets of 6" O. D., only 4 to 6 inches need be trimmed from its circumferential end edges. As a result, waste at this point is reduced approximately 50%. When expanded endwise, it attenuates and sags and must therefore be manually expanded sidewise to uniform width. But its structure in the central area is so improved that the amount of sag is very substantially reduced and this in turn reduces the total, of the sag loss areas, to a value approximately 3% to 5% of the total areas as compared to 20 to 25% heretofore. Furthermore, the thicker mats can be expanded endwise to a satisfactory length, say 300 feet, without reducing their width below 62 inches and this wider width permits a wider range of sizes of air filter pads to be cut from each expanded or "fluffed" mat efficiently so that the final trim losses are again substantially reduced. Finally, each finished pad is more uniform in fibre distribution, structurally stronger and more resilient. It has a much higher resistance to compression and, due to this improvement, the spray resins employed need not be limited to a type which contributes to the compression resistance of the pad; hence any of a wider group of resins may be employed while the reheating and respraying operations can normally be eliminated.

The improvement in uniformity of fibre distribution is believed to be the inherent result of the manner of laying the fibres. It has been noted that, in each layer of the expanded fibres, certain filaments appear to lie more or less straight in the "plane" of that layer while other filaments are twisted, crinkled, curled or undulated in such a manner as to project into adjacent and spaced layers so to intermingle with the fibres thereof. When the bonding agent sets, these intermingling fibres become bonded to the fibres with which they connect. Since these intermingling bonded fibres appear to be uniformly distributed throughout the mat, it is plausible that this condition is largely responsible for the marked improvement in the structural strength, resiliency and resistance to compression. In expanding mats of the character made prior to this invention some degree of fibre undulation was necessarily obtained. In mats made in accordance with the present invention, the degree and frequency of these undulations appears to have been substantially increased. The precise reason for this increase is not known. It may be that the shorter filaments in each filament pattern control or govern the expansion pattern of the mat and that the longer filaments thereof must curl or undulate during expansion to conform to the expansion pattern of the mat.

*Progressive packing*

It is often desirable to increase the fibre density of a mat in the proposed direction of air flow through the mat either continuously or by one or more individually distinct increments. In the air filter art, this is known as progressive packing. In accordance with the present invention, a filamentous mat may be progressively packed by progressively changing the fibre density of the mat during the formation of the mat.

With a constant glass feed rate, the fibre density may be increased either (a) by increasing the rotational speed of the drum so as to increase the length of a filament drawn from a unit amount of glass and thus decrease the fibre diameter of the filament or (b) by increasing both the rotational speed of the drum and the traversing speed of the furnace in a manner such as to maintain the same ratio of drum speed to furnace speed; both of these changes involving an increase in drum speed. Conversely, the fibre density may be decreased by (a) decreasing the rotational speed of the drum so as to reduce the length of a filament drawn from a unit amount of glass and thus increase its diameter or (b) decreasing both speeds in a manner such as to maintain the same ratio.

I have obtained excellent progressive packing results by maintaining a ratio of say 60 R. P. M. of the drum to each traverse of the furnace (60:1) while reducing the speed of the drum and furnace at one or more spaced intervals during the formation of the mat, the rate of glass fed during such formation being held more or less constant. As the speed is thus reduced, the voids in the mat become large.

The "weave" of the mat may be varied by varying the furnace speed relatively to the drum. With a relatively slow furnace speed, successive turns of a filament lie close together but, as the relative furnace speed is increased, the spacing between successive turns is progressively increased and the angle at which they lie to the plane of rotation likewise increases. While an increase in this angularity tends to lengthen the filament drawn from a unit amount of glass, such increase in length is not substantial; hence the resulting decrease in fibre diameter is relatively insignificant.

Having described my invention, I claim:

1. A method of making a condensed filamentous mat comprising: transversely reciprocating a feeder axially back and forth along a drum; rotating the drum a multiplicity of times during each traverse of the feeder; feeding a filament from the feeder to the drum during successive traverses to build up a cylindrical mat composed of a corresponding succession of layers with each layer containing a multiplicity of helical turns extending continuously through a central area from one end reversal area to another; varying the transverse speed of the feeder, during each traverse through the central area, so as to vary the axial spacing and the angularity between successive turns of said filament; and slitting said cylindrical mat axially to form a sheet-like mat.

2. The method of claim 1 including: performing said transverse speed varying step in a cyclically repetitive pattern so as to vary said filament spacing and angularity in a corresponding pattern.

3. The method of claim 2 including: repeating the pattern of said speed variation step a whole number of times plus a fraction during each traverse so as to repeat said filament pattern correspondingly.

4. The method of claim 1 wherein: said filament feeding step comprises feeding a glass filament from the feeder to the drum.

5. A condensed filamentous sheet-like mat of the type normally formed by winding a cylindrical mat upon a drum, slitting the mat axially to remove it from the drum and trimming it longitudinally to remove its axial end areas, comprising: a series of overlying layers, each layer containing several transversely-extending successions of longitudinally-extending, noncrossing filaments which vary in transverse spacing and angularity relatively to each other; said transverse spacing and said angularity, between the filaments of each succession in each layer, varying progressively across the mat in accordance with a predetermined pattern; the longitudinally-extending filaments of certain spaced layers lying in obliquely crossed relationship to the filaments of certain interposed layers of said series.

6. The mat of claim 5 wherein: each succession of filaments in each layer varies in accordance with a succession of whole patterns plus a fraction of one pattern; and each pattern in each successive layer, of one set of layers, is at least partially offset transversely from each pattern in each preceding layer of the same set.

7. An air filter medium comprising: the mat of claim 6 in an expanded thickness and transversely stretched condition; and a filament binder on the filaments.

8. An air filter medium comprising: a series of overlying layers, one upon the other; each layer containing an expanded pattern of transversely-spaced longitudinally-extending filaments which, in the general direction of their respective lengths, vary in angularity relatively to each other, the filaments of certain spaced layers lying in obliquely crossed relationship to the filaments of other interposed layers; and a filament binder on the filaments.

9. A method of making a progressively packed and condensed filamentous mat comprising: feeding a filament from a feeder while transversely reciprocating the feeder across a central area between end reversal areas; winding said filament on a drum while rotating the drum a multiplicity of times during each traverse of the feeder; progressively changing the drum speed value in one direction during the formation of said mat; and, after said mat is of the desired thickness, removing said mat from said drum by slitting it between the ends of said drum.

10. The method of claim 9 wherein: as the rotational speed value of the drum is changed in one direction, the average lineal speed value of the feeder across the drum is changed in the same direction.

11. The method of claim 9 wherein: the transverse speed value of the feeder relatively to the drum is varied as the feeder passes through the central area.

12. The method of claim 9 wherein: the transverse speed value of the feeder relatively to the drum is varied cyclically during each traverse of the feeder through the central area; and as the rotational speed value of the drum is changed in one direction, the number of feeder traverses per minute is changed in the same direction in a predetermined manner such as will tend to maintain substantially the same ratio of drum revolutions per minute to feeder traverses per minute.

13. An apparatus for making a condensed mat comprising: a filament receiving surface; a pair of eccentrically mounted discs positioned adjacent the edges of said surface; an endless band extending around said discs and arranged transversely of said surface; a filament feeder carried by said band for laying filaments on said surface; means for moving said surface across said band; and means for rotating said discs to drive said band.

14. An apparatus as specified in claim 13 wherein: the discs are sprockets; the endless band is a chain, and the number of links in said chain in an uneven multiple of the number of teeth in a sprocket to provide hunting links.

15. The air filter medium of claim 8 wherein: the average density of the filaments contained therein progressively increases from one outer layer to the opposite outer layer.

References Cited in the file of this patent

UNITED STATES PATENTS

| | | |
|---|---|---|
| 933,092 | Metz | Sept. 7, 1909 |
| 1,957,979 | Richter | May 8, 1934 |
| 2,081,060 | Modigliani | May 18, 1937 |
| 2,281,747 | Campbell | May 5, 1942 |
| 2,338,722 | Jackson | Jan. 11, 1944 |
| 2,476,582 | Browne et al. | July 19, 1949 |
| 2,477,555 | Roberts et al. | July 26, 1949 |
| 2,546,230 | Modigliani | Mar. 27, 1951 |
| 2,605,053 | Broden | July 29, 1952 |
| 2,609,320 | Modigliani | Sept. 2, 1952 |

Disclaimer 2,798,531.—*Robert L. Jackson, Jr.*, Charlestown, Ind. CONDENSED FILAMENTOUS MAT AND METHOD AND APPARATUS FOR MAKING SAME. Patent dated July 9, 1957. Disclaimer filed Mar. 7, 1963, by the assignee, *American Air Filter Company, Inc.*

Hereby enters this disclaimer to claim 1 of said patent.

[*Official Gazette May 7, 1963.*]